Figure 1:
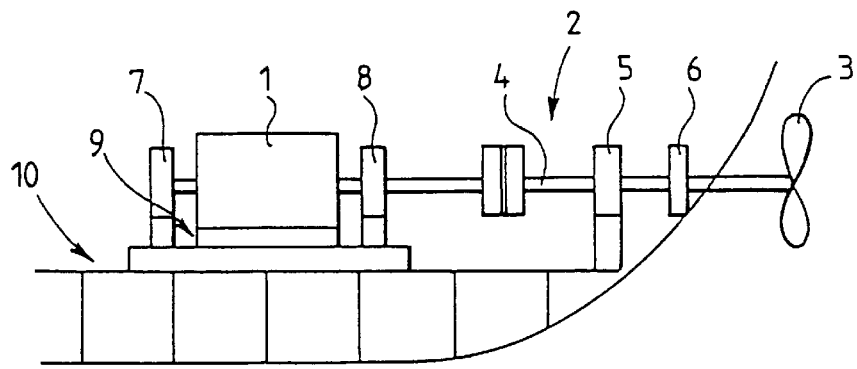

United States Patent

Mantere

[11] Patent Number: 5,827,095
[45] Date of Patent: Oct. 27, 1998

[54] MOUNT STRUCTURE FOR SUPPORTING AN ELECTRIC APPARATUS ON A GROUND BASE

[75] Inventor: Juhani Mantere, Tuusula, Finland

[73] Assignee: ABB Industry Oy, Helsinki, Finland

[21] Appl. No.: 930,758

[22] PCT Filed: Apr. 18, 1996

[86] PCT No.: PCT/FI96/00209

§ 371 Date: Oct. 8, 1997

§ 102(e) Date: Oct. 8, 1997

[87] PCT Pub. No.: WO96/33092

PCT Pub. Date: Oct. 24, 1996

[30] Foreign Application Priority Data

Apr. 19, 1995 [FI] Finland ..................... 951860

[51] Int. Cl.$^6$ .................................. B63H 21/30
[52] U.S. Cl. .............. 440/6; 440/111; 248/638
[58] Field of Search ............ 440/6, 49, 111, 440/112; 248/637, 638, 646, 560

[56] References Cited

U.S. PATENT DOCUMENTS

| | | | |
|---|---|---|---|
| 4,744,539 | 5/1988 | Stimeling | 248/638 |
| 4,978,320 | 12/1990 | Chaplin et al. | 440/111 |
| 5,022,628 | 6/1991 | Johnson et al. | 440/111 |
| 5,054,740 | 10/1991 | Wheeler . | |
| 5,160,113 | 11/1992 | Whiddon | 248/638 |

FOREIGN PATENT DOCUMENTS 85354  4/1955  Norway .

Primary Examiner—Stephen Avila
Attorney, Agent, or Firm—Watson Cole Grindle Watson, P.L.L.C.

[57] ABSTRACT

The present invention relates to a mount structure for supporting an electric motor comprising a rotor and a stator frame, such an electric motor being preferably a marine engine rotating a propeller, on a ground base, such as a hull of a ship. The mount structure comprises at least one vibration damping unit, which comprises a vibration damping rail, which is arranged to receive and damp the vibration of the electric motor and which is secured to the stator frame. In order that the mount structure would also be durable in long-term use and that it would be capable of damping vibration caused by the electric motor within the frequency range considered to be disturbing in the application, spacing means are attached to the vibration damping rail in a manner known as such for securing it at a distance from the stator frame and at a distance from the ground base; and, relieving means constituting material weakening are provided in the vibration damping rail to increase the elasticity of the vibration damping rail in such a manner that the vibration damping rail yields significantly in two directions, which are at right angles to each other, one direction being parallel to the upper surface of the vibration damping rail and the other direction being transverse to the longitudinal direction of the vibration damping rail.

11 Claims, 3 Drawing Sheets

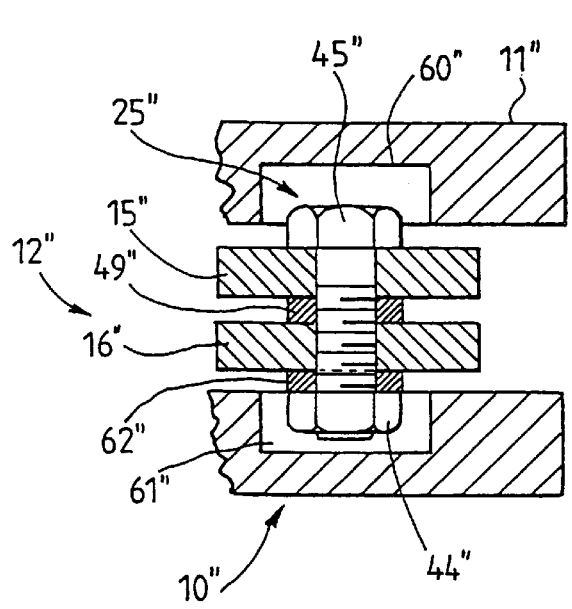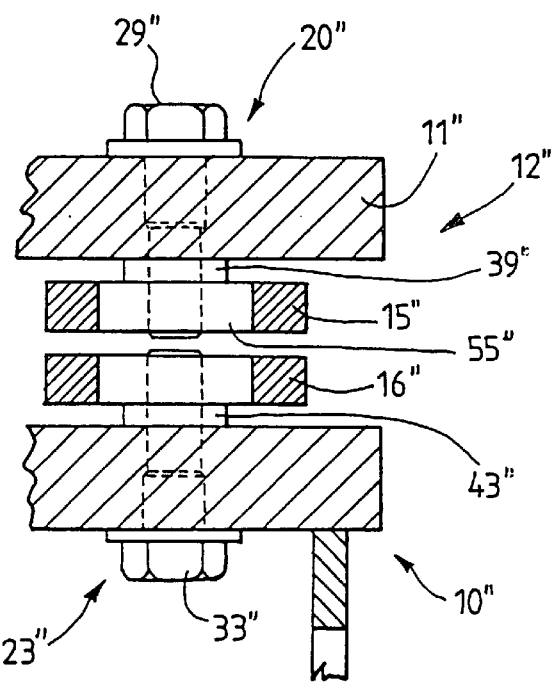

MOUNT STRUCTURE FOR SUPPORTING AN ELECTRIC APPARATUS ON A GROUND BASE

The present invention relates to a mount structure for supporting an electric apparatus comprising a rotor and a stator frame on a ground base. More particularly, the present invention relates to a mount structure for supporting an electric apparatus comprising a rotor and a stator frame, such an electric apparatus being preferably a marine engine rotating a propeller, on a ground base, such as a hull of ship, said mount structure comprising at least one vibration damping unit, which comprises a vibration damping rail, which is arranged to receive and damp the vibration of the electric apparatus and which is secured to the stator frame.

It is a known procedure to support apparatuses and engines causing vibration and trembling, for instance combustion engines, against the mount thereof by means of structures damping vibration or trembling, the object being to prevent the vibration from being transmitted to the ground base. If the ground base is very sturdy, vibration is not usually a great problem. However, if the type of the base is such that it may resonate according to the vibration of the apparatus and the engine, the vibration may become a great problem.

Many types of vibration damping structures are known in the above-mentioned objects. One commonly used way of damping vibration is to use elastomers, such as rubbers, which may be connected to different metal elements, such as bolts, flanges, sleeves, etc. The aim is thus to achieve an elastic structure, which also provides the structure with sufficient rigidity. In damping the vibration of combustion engines, rubber dampers and the like are widely used. Rubber dampers are used for instance in diesel engine—generator combinations, which are mounted on a common ground base. A problem of vibration dampers containing elastomers is that the capability of elastomers to damp vibration deteriorates as the elastomers age. Due to this, the use of rubber dampers is not desirable in objects which have to operate for a long time, and for which laborious repair service is not possible or is extremely undesirable. In addition, the problem with highly elastic dampers is that they also allow relatively large movement, which may cause high stresses on power transmission components provided in the shaft line if the combustion engine is rigidly attached directly to the shaft line. If elastic vibration dampers are used under a motor driving a propeller, a flexible clutch must also be used.

U.S. Pat. No. 5,160,113 discloses the mounting of an electric apparatus to a base by means of a vibration damping unit. The solution described in the publication is not suited for damping the vibration of a marine engine effectively.

Electric apparatuses, such as electric motors, constitute a group of apparatuses in which vibration and trembling are not usually a major problem. However, if an electric apparatus is large with respect to the ground base it rests on, great vibration may be produced in the ground base. The specific resonance of the ground base may be within a range which further intensifies the vibration. Trembling may also become a problem in applications where the requirements concerning the level of vibration are strict.

For instance vibration spreading in ships through structures is typically within a frequency range of 100–2000 Hz. Such vibration may cause disturbing noise for instance in cabins through resonating wall surfaces. The vibration causes small alternating motion in the hull, the magnitude of such motion being for instance 1 mm/s. Such vibration may be disturbing for instance in passenger ships, because of which the motion caused by the vibration is reduced, if possible, to be for instance lower than 0.3 mm/s.

The object of the present invention is to provide a mount structure for an electric apparatus, significantly reducing vibration and obviating the disadvantages mentioned above. The invention is preferably applied in ships, but other uses are also possible.

These aims are achieved with the mount structure of the invention, characterized in that spacing means are attached to the vibration damping rail in a manner known as such for securing it at a distance from the stator frame and at a distance from the ground base, and that relieving means constituting material weakening are provided in the vibration damping rail to increase the elasticity of the vibration damping rail in such a manner that the vibration damping rail yields significantly in two directions, which are at right angles to each other, one direction being parallel to the upper surface of the vibration damping rail and the other direction being transverse to the longitudinal direction of the vibration damping rail. The vibration damping rail is produced easily and at low cost by cutting it from steel plate or some other metal plate.

The mount structure preferably comprises at least two elastic vibration damping units, which both comprise at least two elastic vibration damping rails, which are spaced apart in the vertical direction, the upper vibration damping rail being secured to the stator frame at a distance from it and the lower vibration damping rail being secured to the ground base at a distance from it, and the upper and the lower vibration damping rail being secured to each other, the upper vibration damping rail being thus arranged to receive and damp the vibration of the electric motor and the lower vibration damping rail being arranged to receive and damp the vibration transmitted from the upper vibration damping rail. Such a structure can be easily manufactured to support electric apparatuses of different sizes and weights.

The upper vibration damping rail is preferably secured to the stator frame by means of essentially inelastic spacing/securing means, which are arranged at determined distances from one another in the longitudinal direction of the vibration damping rail, the lower vibration damping rail being thus also secured to the ground base by means of essentially inelastic spacing/securing means, which are arranged at determined distances from one another in the longitudinal direction of the vibration damping rail. In the latter case, the spacing/securing means are preferably made of metal and dimensioned to be strong, without rubber dampers or other elastomeric dampers, which may fatigue and become brittle.

The vibration damping rails preferably consist of plate-like rails manufactured of steel or some other metal, in which are provided relieving openings in areas between the holes for said spacing/securing means and spacing/securing elements to increase the elasticity of the vibration damping rails in such a manner that the vibration damping rails yield significantly in two directions, which are at right angles to each other, one direction being parallel to the level of the upper surface of a vibration damping rail and the other direction being transverse to the longitudinal direction of the vibration damping rails. Such metal rails are easy to manufacture.

The preferred embodiments of the invention are disclosed in the appended claims 2–12.

The vibration damping unit of the invention transmits the vibration of the electric apparatus to the base in such a manner that vibration in a disturbing frequency range is not transmitted in a disturbing degree to the base. On the other hand, the solution of the invention also provides such support for the electric apparatus that is also capable of transmitting and enduring great momentums caused by different failures, such as a short circuit of the electric apparatus, in addition to stresses taking place in normal use. The mount structure of the invention enables the electric apparatus to be connected rigidly to the shaft line. An important advantage of the mount structure of the invention is also its endurance in long-term use. In addition, the structure of the mount structure is simple, and it does not require technical expensive special solutions.

Figure 2:
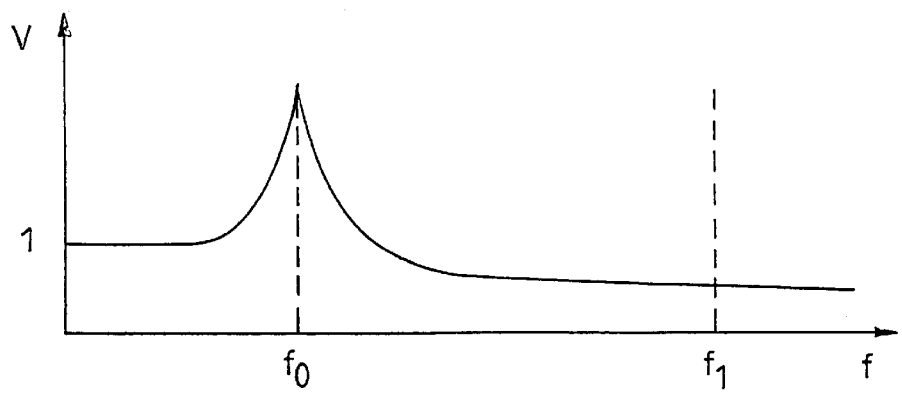
Figure 3:
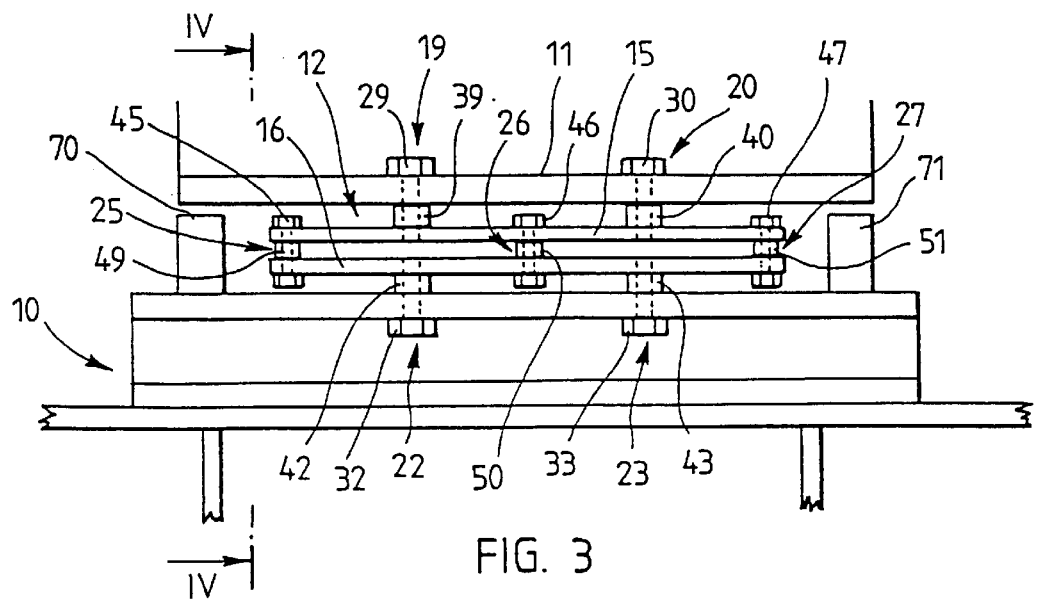
Figure 4:
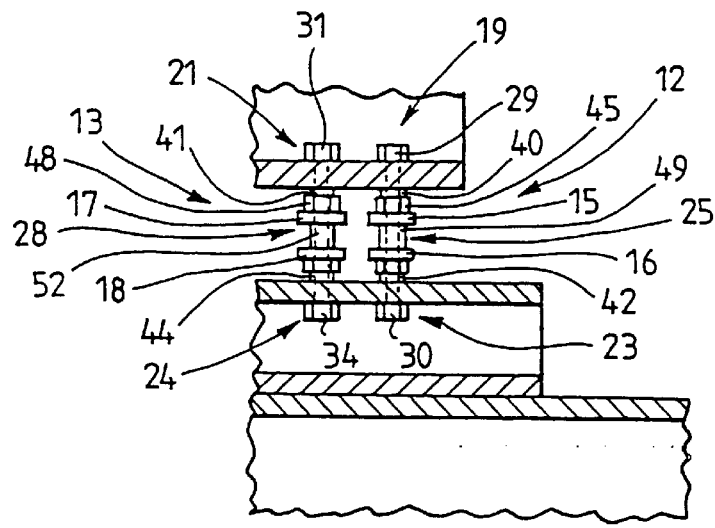
Figure 5:
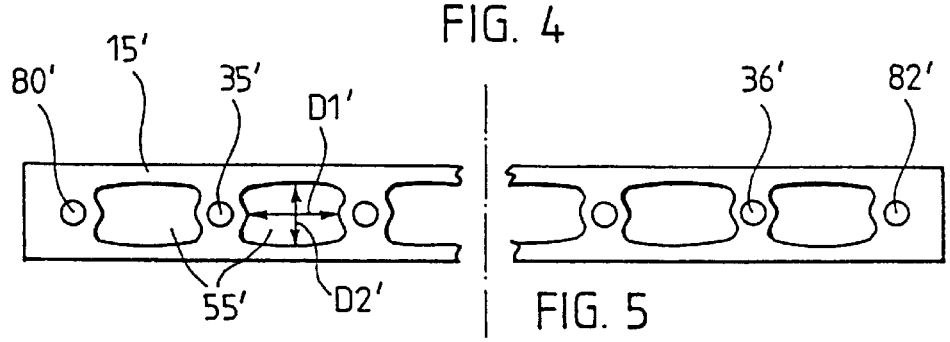
Figure 6:
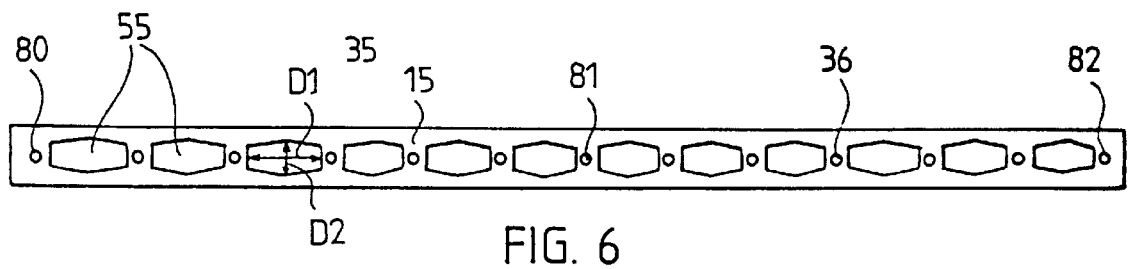
Figure 7:
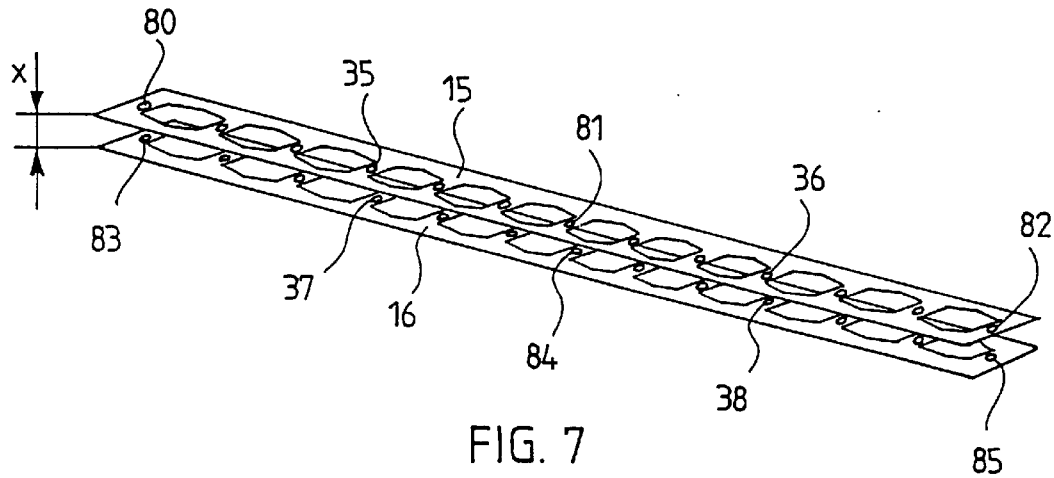

In the following, the mount structure of the invention will be described in more detail with reference to the accompanying drawing, in which FIG. 1 illustrates schematically a marine electric motor as mounted on the hull of the ship by means of a mount structure, FIG. 2 shows a vibration amplification curve, FIG. 3 shows the mount structure of FIG. 1 in more detail, FIG. 4 shows a cross section of the mount structure as taken along the line IV—IV in FIG. 3, FIG. 5 shows a top view of a vibration damping rail used in the mount structure, FIG. 6 shows a second embodiment of the vibration damping rail used in the mount structure, FIG. 7 illustrates the positioning of the vibration damping rails of FIG. 6 in a vibration damping unit, and FIGS. 8 and 9 illustrate an embodiment alternative to the solution of FIG. 4 in producing a vibration damping unit.

FIG. 1 shows an electric motor 1 of a passenger ship or some other ship, this electric motor being arranged to rotate a propeller 3 by means of power transmission means 2. The power transmission means 2 include a shaft 4 and bearings 5, 6 resting on bearing blocks. Reference numerals 7 and 8 indicate the bearings of the electric motor 1.

The electric motor 1 is mounted on the hull 10 of the ship by means of a mount structure 9, the hull thus acting as a so-called ground base.

FIG. 2 illustrates how the vibration of the electric motor 1 is transmitted in the hull of the ship when the ship comprises the mount structure 9 of the invention. The vertical axis of the figure represents amplification and the horizontal axis represents frequency. When the amplification value is 1, vibration amplification does not take place in the hull of the ship, and vibration damping does not take place in the hull, either. The figure shows that at frequency $f_1$, the amplification is clearly below the value 1, and at frequency $f_0$, the amplification has a maximum value, which is significantly greater than the value 1. At frequency $f_1$, which is for instance about 300 Hz, the vibration of the electric motor is damped significantly due to the mount structure, and at frequency $f_0$, which is for instance 25 Hz, the vibration is amplified. Such very low frequencies are not a problem in practice, however. By means of structurally simple stoppers, the low-frequency, high-amplitude motion of the stator frame can be prevented, and this will be discussed in more detail below.

FIG. 3 shows the mount structure 9 of FIG. 1 in more detail. Four vibration damping units 12 are mounted between the stator frame 11 of the electric motor 1 and the hull 10 of the ship acting as a ground base, one of these vibration damping units being shown in FIG. 3, and a vibration damping unit 13, located adjacently to said vibration damping unit, being shown in FIG. 4, which is a cross-section of FIG. 3 as taken along the line IV—IV. The vibration damping units are arranged in pairs on opposite sides of the bottom of the stator frame 11.

FIGS. 3 and 4 show that the vibration damping units 12, 13 both comprise two straight vibration damping rails 15, 16, and 17, 18, respectively, which are spaced apart in the vertical direction. The distance is for instance about 30–40 mm. The vibration damping rails 15–18 are metal, elastic rails, which are capable of yielding both in the vertical direction and the horizontal direction transversely to their longitudinal direction. The upper rails 15, 17 are secured to the stator frame 11 at a distance from it by means of spacing/securing means 19, 20, 21. Correspondingly, the lower rails 16, 18 are secured to the hull 10 of the ship at a distance from it by means of spacing/securing means 22, 23, 24. The vibration damping rails 15, 16 and 17, 18 provided in the same vibration damping unit are secured to one another by means of spacing/securing elements 25–28. Even if only few spacing/securing means are shown in FIG. 3, a plurality of these means are typically provided in an actual structure as arranged at determined distances from one another along the vibration damping rails. The same is true of the spacing/securing elements.

The spacing/securing means 19–24 comprise a screw 29–34, the end of which is screwed into holes 35–38 provided in the vibration damping rails 15–18, see FIGS. 3, 4 and 7. In addition, the spacing/securing means 19–24 comprise a sleeve 39–44 arranged around the screws and keeping the vibration damping rails 15, 17 and 16, 18 apart from the stator frame 11 and the base 10, respectively.

The spacing/securing elements 25–28 comprise bolts 45–48, around the shanks of which are arranged spacer sleeves 49–52, which keep the vibration damping rails of the same vibration damping unit at a distance from one another. The bolts 45–48 comprise nuts, by means of which the vibration damping rails are tightened to one another. Alternatively, it is conceivable that no nuts are provided, but the bolts are tightened directly to threads provided in the holes of the vibration damping rails. In FIG. 7, reference numerals 80–85 indicate holes for the bolts.

The upper vibration damping rails 15, 17 are arranged to receive and damp the vibration of the electric motor, and the lower vibration damping rails 16, 18 are arranged to receive and damp the vibration transmitted from the upper vibration damping rail.

The presented arrangement provides the stator frame 11 with vibration-damping support against the base 10 without elastic rubber parts, which are prone to becoming brittle. The damping properties of the vibration damping units are thus based on a vibration damping structure manufactured of metal components, and the mount structure is at least essentially fully metal.

In FIG. 3, reference numerals 70 and 71 indicate stoppers resting on the base 10. The stoppers 70, 71 prevent possible high-amplitude, low-frequency oscillations of the electric motor 1. The stoppers 70, 71, which may be pieces of steel, are arranged between the ground base 10 and the stator frame 11 in such a manner that a small gap remains between the stoppers and the stator frame, this gap enabling the normal operation of the vibration damping unit 9. The size of the gap is typically 1–3 mm. If desired, the gap can be filled with elastomer material partly or entirely. Alternatively, the stoppers could be secured to the stator frame, whereby a gap would remain between the stoppers and the ground base. If desired, another alternative is to construct the stoppers of sufficiently hard elastomer material, since they are in active operation only for a short while when the electric motor rotates. Thus, they are hardly exposed to aging and fatigue.

The adjacent vibration damping units are at a distance of 150–300 mm from each other, this distance representing the distance between the longitudinal symmetry axes of the vibration damping rails 15 and 17.

FIG. 5 shows a top view of an embodiment of a vibration damping rail 15'. It is apparent that relieving openings 55' are provided, preferably by piercing, in the rail 15' in areas between holes 80', 35', 36', 82' provided for the spacing/securing means and the spacing/securing elements. The purpose of the relieving openings 55' is to provide essential elasticity in the vibration damping rail 15' in a direction parallel to the level of the upper surface of the vibration damping rail and perpendicularly to the longitudinal direction of the vibration damping rail. Naturally, the relieving opening 55' also increases elasticity in the direction perpendicular to said direction and perpendicularly to the level of said upper surface.

The relieving openings 55' comprise two diameters D1' and D2' of different magnitudes, which are at right angles to each other. The greater diameter D1' follows the longitudinal direction of the vibration damping rail. The holes and openings according to FIG. 5 are easy to produce in the rail, and they enable good elastic properties and vibration damping.

FIGS. 6 and 7 show a second way of implementing the vibration damping rail 15. The references in FIGS. 6 and 7 correspond to the references in FIG. 5. The embodiment of the figures differs from the embodiment of FIG. 5 in the respect that the relieving openings 55 are simpler in shape and easier to produce.

The thickness of the vibration damping rails of FIGS. 5 and 6 is about 20–30 mm, and the width is about 80–170 mm. The shorter diameter D2, D2' of the relieving openings 55, 55' is preferably 40–80% of the width of the vibration damping rail. When these values are applied, efficient vibration damping is achieved. In practice, the rails and the relieving openings provided therein must be dimensioned in such a manner that desired damping properties are achieved and desired moment transmission properties are retained.

FIG. 7 shows two vibration damping rails 15, 16 belonging to the same vibration damping unit. The rails 15, 16 are at a distance of X=10–40 mm from each other, X thus indicating the magnitude of the air gap between the rails.

FIGS. 8 and 9 show a way alternative and analogous to FIG. 4 for implementing vibration damping rails 15", 16". FIG. 8 illustrates a cross section at a spacing/securing element 28". The embodiment of FIG. 8 differs from the embodiment of FIG. 4 in the respect that a recess 60" is provided in the stator frame 11' for the head of the bolt 41" of the spacing/securing element connecting the vibration damping rails 15", 16", and a recess 61" is provided in the base 10" for the nut 44" of the bolt 41". A reference numeral 62" indicates a washer. The arrangement of FIG. 8 enables space saving in the vertical direction. Naturally, in the case of FIG. 8, a bolt containing no nut can be used as the spacing/securing element, such a bolt attaching itself by means of its threads directly to the rail 16", the recess 61" for the nut being thus not needed. The latter alternative requires, however, that a threaded hole is provided in the rail 16", the manufacture of such a hole not being as simple as that of a drilled hole with smooth walls. If desired, the bolts and nuts between the vibration damping rails can be replaced with a fixed joint, for instance a welded joint. In the latter case, the spacer sleeves could be welded at their ends to the vibration damping rails.

FIG. 9 corresponds to the arrangement of FIG. 8, but the figure is a cross section taken along the middle of a relieving opening 55". In FIG. 9, the same references as in the other figures are used to indicate the corresponding parts.

The invention has been described above only by means of examples, and it is therefore pointed out that the details of the mount structure of the invention can be implemented in various ways within the scope of the appended claims. Thus, it is possible that the mount structure consists of only two vibration damping units, the first one being mounted near a first side of the electric motor and the second one being mounted near that side of the electric motor which is opposite to the first side. It is even conceivable that the mount structure consists of only one vibration damping unit, which essentially consists of only one vibration damping rail, which is secured to the stator frame at a distance from it and to the ground base at a distance from it. However, it is probable that with a mount structure consisting of only two or one vibration damping units, it is not possible to achieve as good moment transmission properties as in a case where there are four vibration damping units according to FIGS. 3 and 4.

It is also possible that the vibration damping unit comprises more than two vibration damping rails spaced apart in the vertical direction. Naturally, the structure will become the more complicated the more vibration damping rails the same vibration damping unit contains. In principle, in the vibration damping units, it is possible to use bent vibration damping rails, bent for instance at their ends towards one another or bent at their ends away from one another, whereby it could be conceivable that the spacer parts provided at the ends of the vibration damping rails, for instance the sleeves 39, 42 or 40, could be omitted from the structure. The vibration damping rails of the same vibration damping unit are thus, in a way, directly attached to one another (when the rails are bent at their ends towards one another) or directly attached to the stator frame or the ground base (when the rails are bent at their ends away from one another), even if the rails are in other respects located at a distance from one another or correspondingly from the stator frame and the ground base. It is also conceivable that the vibration damping rails are bent in such a manner that they appear wavy as seen from the side. Bent vibration damping rails are, however, significantly more difficult to manufacture than straight ones. As an alternative to the relieving openings 55, 55', in order to achieve essential elasticity in the direction of the level of the vibration damping rails, it is conceivable that material weakening acting as a relieving means is achieved in areas between the holes (for instance the holes 80 and 35) provided for the spacing/securing means and the spacing/securing elements of the vibration damping rails by narrowing the sides of the vibration damping rails. In the latter case, the edges of the vibration damping rails could have a wavy configuration, one wave being located between two holes. However, it can be assumed that such a wavy-edged vibration damping rail is not as simple to implement as a vibration damping rail with relieving openings. Furthermore, it is naturally conceivable that the vibration damping rails are indirectly secured in different ways to the stator frame 11.

I claim:

1. A mount structure (9) for supporting an electric apparatus (1) comprising a rotor and a stator frame, such an electric apparatus being preferably a marine engine rotating a propeller, on a ground base (10, 10"), such as a hull of ship, said mount structure (9) comprising at least one vibration damping unit (12, 13, 12"), which comprises a vibration damping rail (15–18, 15", 16"), which is arranged to receive and damp vibration of the electric apparatus (1) and which is secured to the stator frame (11, 11"), spacing means (39–41, 39" and 42–44, 43") being attached to the vibration damping rail (15–18, 15", 16") for securing it at a distance from the stator frame (11, 11") and at a distance from the ground base (10, 10"), and relieving means (55, 55', 55") constituting material weakening being provided in the vibration damping rail (15–18, 15", 16") to increase the elasticity of the vibration damping rail in such a manner that the vibration damping rail yields significantly in two directions, which are at right angles to each other, one direction being parallel to the upper surface of the vibration damping rail and the other direction being transverse to the longitudinal direction of the vibration damping rail, characterized in that the mount structure (9) comprises at least two elastic vibration damping units (12, 13, 12"), which both comprise at least two elastic vibration damping rails (15–18, 15", 16"), which are spaced apart in the vertical direction, the upper vibration damping rail (15, 17, 15") being secured to the stator frame (11, 11") at a distance from it and the lower vibration damping rail (16, 18, 16") being secured to the ground base (10, 10") at a distance from it, and the upper and the lower vibration damping rail (15–18, 15", 16") being secured to each other, the upper and the lower vibration damping rail being thus arranged to receive and damp the vibration of the electric apparatus (1).

2. A mount structure (9) according to claim 1, characterized in that the upper vibration damping rail (15, 17, 15") is secured to the stator frame (11, 11") by means of essentially inelastic spacing/securing means (19, 20, 21, 20"), which are arranged at determined distances from one another in the longitudinal direction of the vibration damping rail, and that the lower vibration damping rail (16, 18, 16") is secured to the ground base (10, 10") by means of essentially inelastic spacing/securing means (22, 23, 24, 23"), which are arranged at determined distances from one another in the longitudinal direction of the vibration damping rail.

3. A mount structure (9) according to claim 2, characterized in that the spacing/securing means (19–24, 20", 23") comprise a screw (29–34, 29", 33"), which acts as a securing means, and a sleeve-like element (39–44, 39", 43") arranged around the shaft of the screw, keeping the vibration damping rails (15–18, 15", 16") at a distance from the stator frame (11, 11") and correspondingly from the ground base (10, 10"), the vibration damping rails being thus provided with holes (35, 36, 35', 36') for the shafts of the screws.

4. A mount structure (9) according to claim 1, characterized in that the upper and the lower vibration damping rail (15–18, 15", 16") are secured to each other by means of essentially inelastic spacing/securing elements (25–28, 25").

5. A mount structure (9) according to claim 4, characterized in that the spacing/securing elements comprise a bolt (45–48, 45"), which acts as a securing means, and a sleeve-like element (49–52, 49") arranged around the shank of the bolt, disposed between the vibration damping rails and keeping the vibration damping rails at a distance from each other in the vertical direction, the vibration damping rails being thus provided with holes (80–85, 80', 82') for the shanks of the bolts.

6. A mount structure (9) according to claim 1, characterized in that the vibration damping rails consist of plate-like metal rails (15–18, 15", 16"), said relieving means (55, 55', 55") being thus provided in areas between the holes for said spacing/securing means and spacing/securing elements.

7. A mount structure (9) according to claim 6, characterized in that the relieving means are relieving openings (55, 55', 55"), which comprise two diameters (D1, D2, D1', D2') of essentially different magnitudes, which are approximately at right angles to each other, the length of the smaller diameter (D2, D2') being about 30–80% of the length of the greater diameter (D1, D1'), and the greater diameter being essentially parallel with the longitudinal direction of the vibration damping rail.

8. A mount structure (9) according to claim 7, characterized in that the vibration damping rails (15–18, 15", 16") are manufactured of steel, their thickness is 20–30 mm and width 80–170 mm, the smaller diameter (D2, D2') of the relieving openings (55, 55') being 40–80% of the width of the vibration damping rail.

9. A mount structure (9) according to claim 1, characterized in that it comprises two vibration damping units (12, 13), the first one being arranged near a first side of the electric apparatus (1) and the second one being arranged near that side of the electric apparatus which is opposite to the first side.

10. A mount structure (9) according to claim 1, characterized in that it comprises two pairs of vibration damping units (12, 13), the first pair being arranged near a first side of the electric apparatus (1) and the second pair being arranged near that side of the electric apparatus which is opposite to the first side.

11. A mount structure (9) according to claim 1, characterized in that it comprises stoppers (70, 71), which are arranged between the ground base (10) and the stator frame (11) in such a manner that a small gap remains between the ground base and the stator frame, said gap enabling the normal operation of the vibration damping unit, said stoppers being arranged to prevent the low-frequency, high-amplitude motion of the stator frame.

* * * * *